Jan. 16, 1968    T. W. GOWANLOCK    3,363,299
CUTTING TOOL ASSEMBLY
Filed May 12, 1966
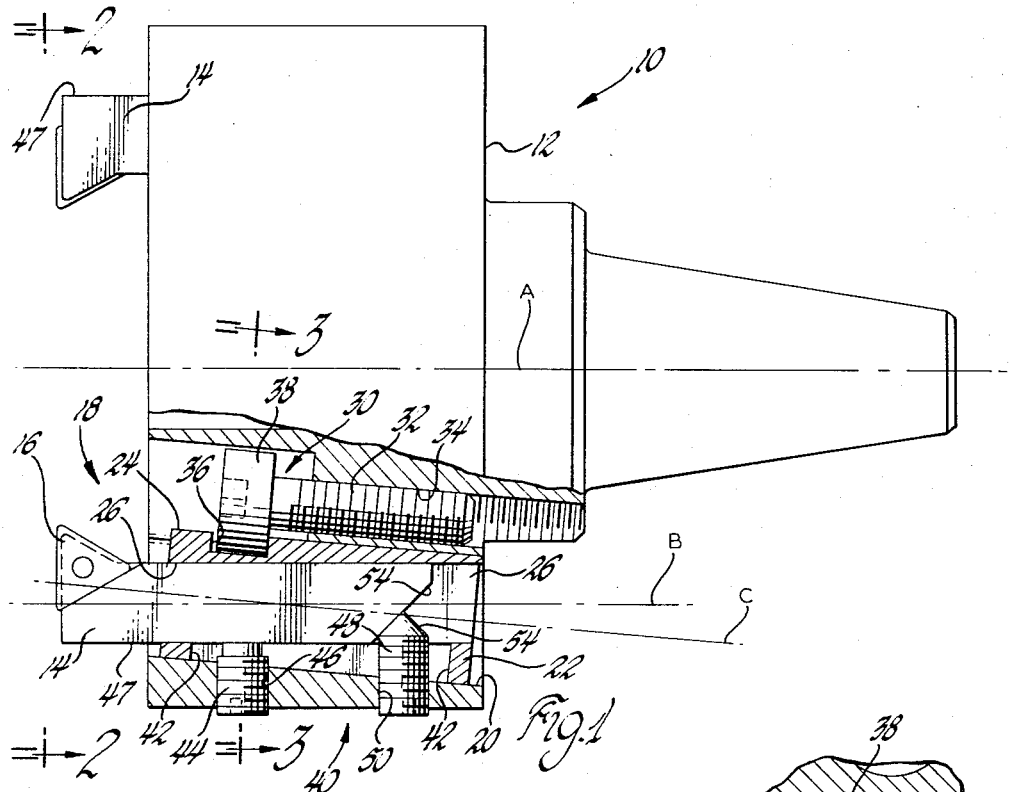
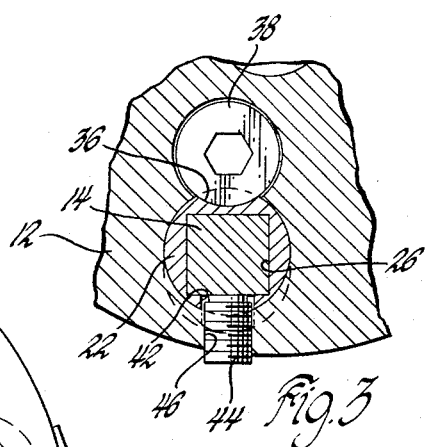
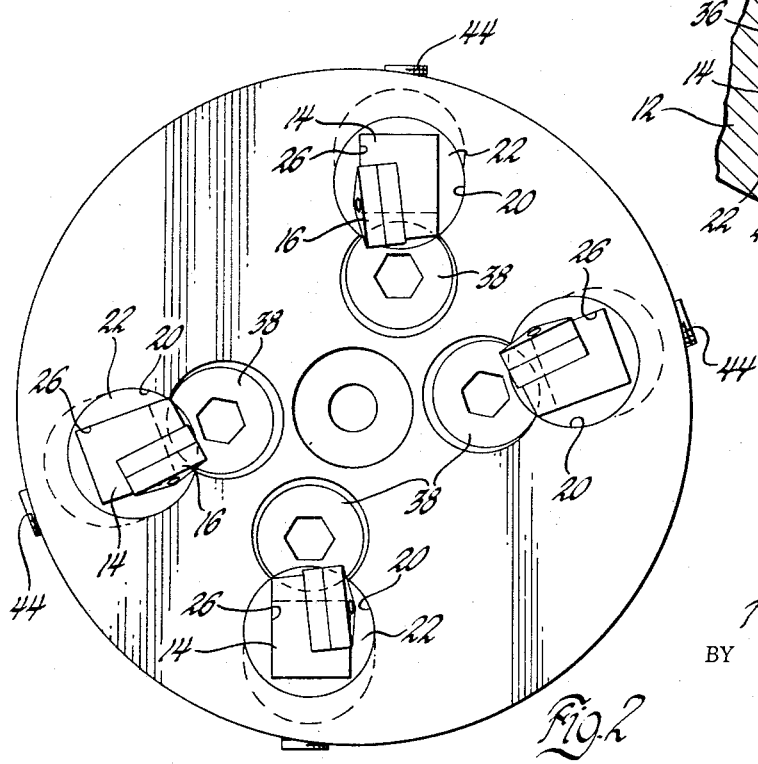
INVENTOR.
Thomas W. Gowanlock
BY
Harold J. Holt
ATTORNEY United States Patent Office 3,363,299
Patented Jan. 16, 1968

3,363,299
CUTTING TOOL ASSEMBLY
Thomas W. Gowanlock, Rochester, Mich., assignor to General Electric Company, a corporation of New York
Filed May 12, 1966, Ser. No. 549,636
12 Claims. (Cl. 29—105)

This invention relates to a cutting tool assembly and, more specifically, to a cutting tool assembly in which one or more individual cutter tools are supported in a toolholder for adjustment in multiple directions relative to the toolholder.

Cutter tools of the instant type such as milling head cutters support shank-like members which in turn support cutting inserts for engaging a workpiece to remove material from the workpiece upon relative movement between the insert and the workpiece. In order that such machining be accurate, it is necessary that the cutting inserts or cutting elements be very accurately positioned relative to the toolholder and to each other.

Usually indexable inserts of the disposable type are secured to the shank-like members for performing the cutting operation. When such inserts are worn, they are removed and replaced, and in very accurate machining operations the dimensional tolerances from one insert to the next may be such that the inserts vary slightly in dimension, and it is therefore desirable to provide an adjustment of the position of the inserts relative to one another and to the toolholder on which they are mounted. Furthermore, it is desirable that adjustment capabilities be provided so that each insert may be adjusted in two different directions. For example, in the case of a milling head cutter, it is desirable that the insert be mounted on a shank-like member which is adjustable in a direction parallel to the axis of rotation of the head and in a direction radially of the axis of rotation of the head.

Accordingly, it is an object and feature of this invention to provide a cutting tool assembly for supporting a cutting element so that the position of the cutting element may be independently adjusted in two directions which are perpendicular to one another.

Another object and feature of this invention is to provide a mechanism associated with a toolholder for supporting a cutting element used in the machining of metal and for selectively adjusting the position of the cutting element both axially and radially relative to the longitudinal axis of the toolholder or the longitudinal axis of the workpiece.

These and other objects and features of this invention may be obtained in a preferred embodiment including a toolholder taking the form of a milling head rotatable about a major axis, a cutter tool having a longitudinal axis and supporting a cutting element on one end, and means attaching the cutter tool to the head and which means is rectilinearly movable relative to the head and the cutter tool for adjusting the distance between the longitudinal axis of the cutter tool and the major axis of rotation of the head while maintaining the axes parallel to one another and for allowing the position of the cutter tool to be adjusted in a direction which is parallel to the axes while maintaining the distance between the axes constant. More specifically, the milling head is adapted for rotation about a major axis and includes a cylindrical pocket which is disposed about an axis inclined at an angle relative to the axis of rotation of the milling head. A cylindrical sleeve is disposed in the pocket so that the outer cylindrical surface of the sleeve is also disposed at the inclined angle relative to the axis of rotation of the milling head. The sleeve has a square bore extending therethrough, the axis of which is parallel to the axis of rotation of the milling head. The shank of the cutter tool having a cross section shaped to fit the bore is disposed in the bore in the sleeve. Upon movement of the sleeve in the pocket, the cutter tool is moved radially relative to the axis of rotation of the head to change the distance between the axis of the cutter tool and the axis of rotation of the milling head. The cutter tool, however, is disposed in the bore in the sleeve so that upon movement of the cutter tool relative to the sleeve, the cutting element on the end of the shank of the cutter tool moves in a direction parallel to the axis of rotation of the milling head. Appropriate adjustment means coact between the milling head and the sleeve and the shank-like member to hold the sleeve and shank-like member in a fixed position relative to the milling head and to respectively adjust the positions of the sleeve and the shank-like member relative to the milling head. Hence, in this manner, a cutting element such as a disposable indexable insert on the end of the cutter tool may be adjusted both radially and axially relative to the axis of rotation of the milling head.

Other objects and attendant advantages of this invention will be readily appreciated as the same becomes better understood by reference to the following detailed description when considered in connection with the accompanying drawings wherein:

FIGURE 1 is a side view partially broken away and in cross section of a preferred embodiment of the instant invention;

FIGURE 2 is a view taken substantially along line 2—2 of FIGURE 1; and

FIGURE 3 is a fragmentary cross-sectional view taken substantially along line 3—3 of FIGURE 1.

Referring now to the drawings, wherein like numerals indicate like or corresponding parts, a cutting tool assembly is generally shown at 10. The cutting tool assembly 10 includes a tool holder illustrated as a milling head cutter 12 which rotates about a major axis A. The toolholder illustrated could however be utilized in fixed position wherein the workpiece rotates. There is also included a cutter tool 14 having a longitudinal axis B and supporting a cutting element 16 on one end. The cutting element 16 is a cutting insert and may be integral with the cutter tool or may be secured to the cutter tool 14 in any well-known manner such as for example those covered in U.S. Patent 3,097,417, filed in the name of Edward Hill and assigned to the assignee of the instant invention, and U.S. application Ser. No. 433,117, filed Feb. 16, 1965, in the name of Walter H. Kelm and assigned to the assignee of the instant invention.

There is also included means generally indicated at 18 for attaching the cutter tool 14 to the milling head 12. The means 18 is rectilinearly movable relative to the milling head 12 and relative to the cutter tool 14 for adjusting the distance between the longitudinal axis B of the cutter tool 14 and the major, or axis of rotation, A of the milling head 12 while at the same time maintaining the axes A and B parallel to one another. The means 18 also allows cutter tool 14 to move rectilinearly relative to the milling head 12 in a direction which is parallel to the axes A and B while maintaining a constant distance between the axes A and B.

More specifically, the milling head 12 has a pocket 20 therein which is defined by a cylindrical hole extending therethrough. The pocket 20 has a cylindrical surface which is disposed about an axis C and the axis C is inclined at an angle relative to the major axis A. The cylindrical sleeve 22 is disposed in the pocket 20 so that its longitudinal axis, which is also axis C, and its outer cylindrical surface 24 are disposed at the inclined angle relative to the major axis A. The sleeve 22 has a plurality of surfaces defining a square bore 26 which extends therethrough and which is disposed about the axis B which is parallel to the major axis A.

The cutter tool 14 is square in cross section and is disposed in the bore 26 of the sleeve 22 so that the longitudinal axis of the cutter tool 14 and the axis of the bore 26 are both defined by the axis B.

A first adjustment means, generally shown at 30, rectilinearly moves the sleeve 22 along the cylindrical surface of the pocket 20 to adjust the distance between the longitudinal axis B of the cutter tool 14 and the major axis A about which the milling head 12 rotates. More specifically, the adjustment means 30 includes a first screw 32 in threaded engagement with a threaded bore 34 disposed in the milling head 12 adjacent the pocket 20. The axis of the threaded bore 34 coincides with the axis of the screw 32 and both such axes are parallel to the cylindrical surface of the pocket 20 and parallel to the axis C. The sleeve 22 has a groove 36 and the head 38 of the screw 32 has a portion extending into the groove 36 so that the sleeve 22 is moved rectilinearly in the pocket 20 upon rotation of the screw 32. Thus, upon rotation of the screw 32, the position of the cutter tool 14 is adjusted in a radial direction relative to the major, or axis of rotation, A in that the distance between the longitudinal axis B of the cutter tool 14 and the major axis A of the milling head 12 is changed.

There is also included a second adjustment means, generally shown at 40, for rectilinearly moving the cutter tool 14 along the surfaces of the bore 26 in the sleeve 22, which surfaces are parallel to the major axis A. Such rectilinear movement of the cutter tool 14 in the bore 26 adjusts the position of the cutter tool 14 in a direction which is parallel to the axis A and B. More specifically, the sleeve 22 has an elongated opening 42 which extends longitudinally along the outer surface 24 and into the bore 26. A second screw 44 threadedly engages a threaded bore 46 in the head 12 and extends through the opening 42 to engage the cutter tool 14 to prevent rectilinear movement of the cutter tool 14. A third screw 48 threadedly engages a threaded bore 50 and extends through the opening 42 in the sleeve 22 to engage the shank of the cutter tool 14 so that the cutter tool 14 moves rectilinearly parallel to the major axis A upon rotation of the screw 48. That is, the screw 48 has a cone-shaped end 52 which engages an inclined surface 54 on the end of the cutter tool 14 so that upon rotation of the screw 48, the cutter tool 14 is adjusted axially relatively to the major axis A. The cutter tool 14 is, therefore, moved rectilinearly in a direction which is parallel to the major axis A and parallel to the longitudinal axis B upon loosening of the screw 44 and rotation of screw 48.

It will be understood, of course, that the fineness of the threads on the screws 32 and 48 will determine how fine the axial and radial adjustments of the cutter tool 14 will be.

It should be understood that although the invention has been described in conjunction with a milling head 12 which rotates about a major axis A, the invention is also applicable to other cutting tool assemblies in which one or more cutter tools are mounted in a fixed block and in which the workpiece rotates during cutting. It will also be clear to those of ordinary skill in the art that although the sleeve 22 is described hereinabove as being cylindrical and the cutter tool 14 is described as being square in cross section, it will be evident that either or both the sleeve 22 and the cutter tool 14 may have various cross sections such as for example hexagonal, triangular, etc. Furthermore, the sleeve 22 need not be a unitary member as illustrated but may be made of numerous components.

What I claim as new and desire to secure by Letters Patent of the United States is:

1. A cutting tool assembly comprising: a toolholder having a major axis, a cutter tool having a longitudinal axis, and means attaching said cutter tool to said toolholder and being rectilinearly movable relative to said toolholder and said cutter tool for adjusting the distance between the longitudinal axis of said cutter tool and the major axis of said toolholder while maintaining the axes parallel to one another and for allowing said cutter tool to move rectilinearly relative thereto in a direction which is parallel to said axes while maintaining the distance between said axes constant.

2. A cutting tool assembly as set forth in claim 1 wherein said toolholder includes a pocket therein having at least one surface which is inclined at an angle relative to said major axis, said means including at least one surface engaging said surface of said pocket and at least one other surface which is parallel to said major axis and engaging said cutter tool.

3. A cutting tool assembly as set forth in claim 2 including first adjustment means for rectilinearly moving said means along said surface of said pocket to adjust said distance between said axes.

4. A cutting tool assembly as set forth in claim 3 including second adjustment means for rectilinearly moving said cutter tool along said other surface of said means to adjust the position of said cutter tool in said direction which is parallel to said axes.

5. A cutting tool assembly as set forth in claim 4 wherein said pocket is formed by a hole in said toolholder, said means including at least one component forming a sleeve disposed in said hole, said other surface which is parallel to said major axis being formed by a bore extending through said sleeve and having an axis which is parallel to said major axis.

6. A cutting tool assembly as set forth in claim 5 wherein said toolholder comprises a milling head adapted for rotation about said major axis and including a plurality of said sleeves supporting a plurality of said members in a plurality of said pockets.

7. A cutting tool assembly as set forth in claim 5 wherein said first adjustment means includes a first screw engaging a bore in said toolholder adjacent said pocket, said bore having an axis which is parallel to the surfaces of said hole forming said pocket, said sleeve having a groove therein and said first screw having a head with a portion thereof disposed in said groove so that said sleeve is moved rectilinearly in said pocket upon rotation of said first screw.

8. A cutting tool assembly as set forth in claim 7 wherein said second adjustment means includes a second screw engaging a bore in said toolholder and engaging said cutter tool so that said cutter tool moves rectilinearly in a direction parallel to said major axis upon rotation of said second screw.

9. A cutting tool assembly as set forth in claim 8 wherein said sleeve has an elongated opening longitudinally of said sleeve, a third screw engaging a bore in said toolholder and extending through said opening in said sleeve to engage said cutter tool for preventing movement of said cutter tool.

10. A cutting tool assembly comprising: a toolholder having a major axis, a cutter tool having a rectangular shank along a longitudinal axis, a cylindrical sleeve mounted in a cylindrical hole in said toolholder, the longitudinal axis and outer cylindrical surface of said sleeve being mounted in said toolholder at an inclined angle to the major axis of the toolholder, said sleeve having a rectangular bore disposed about an axis parallel to the major axis of the toolholder, the rectangular shank of said cutter tool being mounted in the bore of the sleeve, a first adjustment means for moving the sleeve along its longitudinal axis to adjust the radial position of the cutter tool while the cutter tool maintains its axial position, and a second adjustment means to adjust the axial position of said cutter tool while the cutter tool maintains its radial position.

11. A cutting tool assembly as set forth in claim 10 wherein said first adjustment means includes a threaded bore in said toolholder adjacent the cylindrical hole in which the sleeve is mounted, a first screw threaded into said threaded bore with a portion of the head thereof extending into a groove in said sleeve whereby said sleeve is moved rectilinearly relative to said toolholder upon rotation of said first screw for radially adjusting the position of said cutter tool, and said second adjustment means includes a second screw threadedly engaging said toolholder and an end of the shank of the cutter tool whereby said cutter tool is moved rectilinearly along its longitudinal axis for axially adjusting the position of said cutter tool.

12. A cutting tool assembly as set forth in claim 11 wherein said sleeve has an elongated opening longitudinally of said sleeve and a third screw threadedly engaging a threaded bore in said toolholder and extending through said opening in said sleeve to engage said cutter tool for preventing movement of said cutter tool.

References Cited
UNITED STATES PATENTS

| | | | |
|---|---|---|---|
| 2,253,028 | 8/1941 | Hassig | 29—105 X |
| 2,751,663 | 6/1956 | Levzinger | 29—105 |
| 2,968,859 | 1/1961 | Garnett | 29—105 |

HARRISON L. HINSON, *Primary Examiner.*